(12) United States Patent
Borbolla Gonzalez

(10) Patent No.: US 9,433,220 B2
(45) Date of Patent: Sep. 6, 2016

(54) HORIZONTAL AXLE CYLINDRICAL TORTILLA MAKER

(76) Inventor: Teodoro Rodrigo Borbolla Gonzalez, San Antonio, TX (US)

( * ) Notice: Subject to any disclaimer, the term of this patent is extended or adjusted under 35 U.S.C. 154(b) by 330 days.

(21) Appl. No.: 14/006,692

(22) PCT Filed: Apr. 12, 2012

(86) PCT No.: PCT/MX2012/000039
§ 371 (c)(1),
(2), (4) Date: Oct. 1, 2013

(87) PCT Pub. No.: WO2012/141567
PCT Pub. Date: Oct. 18, 2012

(65) Prior Publication Data
US 2014/0026763 A1    Jan. 30, 2014

(30) Foreign Application Priority Data

Apr. 13, 2011    (MX) .................... MX/a/2011/003929

(51) Int. Cl.
*A21B 7/00*      (2006.01)
*A21D 6/00*      (2006.01)
*A21B 5/00*      (2006.01)

(52) U.S. Cl.
CPC *A21B 5/00* (2013.01); *A21B 7/005* (2013.01)

(58) Field of Classification Search
CPC .................................. A21B 5/00; A21B 7/005
USPC ............... 426/496, 497, 502, 512, 513, 517; 99/349, 353, 355, 423, 427, 443 C, 348; 425/363, 374; 100/93 P, 93 RP, 156, 100/210
See application file for complete search history.

(56) References Cited

U.S. PATENT DOCUMENTS

| | | | |
|---|---|---|---|
| 3,695,171 A | | 10/1972 | Hartley |
| 3,985,070 A | * | 10/1976 | Longenecker ........... A21B 5/02 99/353 |
| 4,197,792 A | * | 4/1980 | Mendoza ................ A21B 1/36 425/371 |
| 4,241,648 A | * | 12/1980 | Longenecker ......... A21C 11/00 100/156 |
| 4,281,025 A | | 7/1981 | Longnecker |
| 4,569,851 A | * | 2/1986 | Schultz ................ A47J 37/046 426/496 |
| 4,683,813 A | * | 8/1987 | Schultz ................... A21B 1/44 100/144 |

* cited by examiner

*Primary Examiner* — Dana Ross
*Assistant Examiner* — Ket D Dang
(74) *Attorney, Agent, or Firm* — Peter J. Rashid

(57) ABSTRACT

A tortilla making machine comprising three mechanisms mainly for the process of manufacturing of tortillas and comprises a mixer that supplies and positions the portions of dough to be cooked, a moving press that flattens and shapes the portions of dough, and a cylindrical broiling oven that roast the product by using the curved surfaces on the inner and outer sides of the oven, that incorporates one or several burners or other source of heat in order to keep the surfaces and the inside volume of the oven at an accurate temperature to broil and complete the baking process on the inner side of the oven. The broiling oven is made up of metal tabs laid out along the curved surface of the oven that fold over, either towards the inner or to the outer side of the cylinder, this by gravity alone or supported by springs and closing and opening guides to allow the transition of the product to the inner side to be baked and to the outside to be unloaded.

13 Claims, 6 Drawing Sheets

HORIZONTAL AXLE CYLINDRICAL TORTILLA MAKER

CLAIM TO PRIORITY

This application is a National Stage application of PCT/MX2012/000039 filed on Apr. 12, 2012, which in turn claims priority to Mexican Application No. MX/a2011/003929 filed on Apr. 13, 2011, the entire contents of both of which are incorporated herein by reference.

CROSS-NOTING TO RELATED APPLICATIONS

The invention is related to the field of food cooking machines and baked meals industry, mainly in the production of dough tortillas, or bread and other baked goods that may require a heating process in their development, or other products even when they are not necessarily related to edibles.

BACKGROUND

The current invention is developed along the lines of a new design, more efficient, and simpler in the way it was built, for a continuous process oven. Although many tortilla makers are available, they tend to operate with large amounts of wasted energy, this mostly due to operating in an open environment or operating with large cluster of mechanisms such as the case of US Patent 2009/0208892 where the processed flattened dough pieces are placed on a conveyor belt composed of hot metal plates which cook the product mainly from its bottom side during the moving process. Thereafter they are transferred to a second conveyor belt, to cook in the same manner the upper side which is now facing down.

Another design is the U.S. Pat. No. 4,508,025 which utilizes rotating discs on a vertical axle and a device that lays the raw dough discs and transfers them to the following disc to complete the cooking process and additionally has a pressing system that flattens the corn dough. Said mechanisms do not take advantage of the disposition and the movement of the machine. In both cases there is a large consumption of energy due to heat loss as well as the transferring of the product over large areas.

Advantages on the State of the Art

1. To combine the cooking and baking of a product in an autonomous closed environment.
2. To produce flat shaped meals, which require cooking or broiling on both sides in a simpler manner.
3. To improve the taste of the product by means of a process of fast changing cooking sides within an enclosed oven that would impede heat loss due to leakage.
4. To simplify actual systems trough the implementation of a portion dispenser and flattening mechanism that will take advantage of the motion and elements that embody the machine.
5. To facilitate the making and maintenance of the tortilla maker and to extend its lifetime.

BRIEF DESCRIPTION OF THE FIGURES

The invention is best understood considering the following description, despite the fact that the detailed workings of the invention are explained later. The indexes are similar to all the figures to facilitate the references.

SUMMARY OF THE INVENTION

Figure 1:
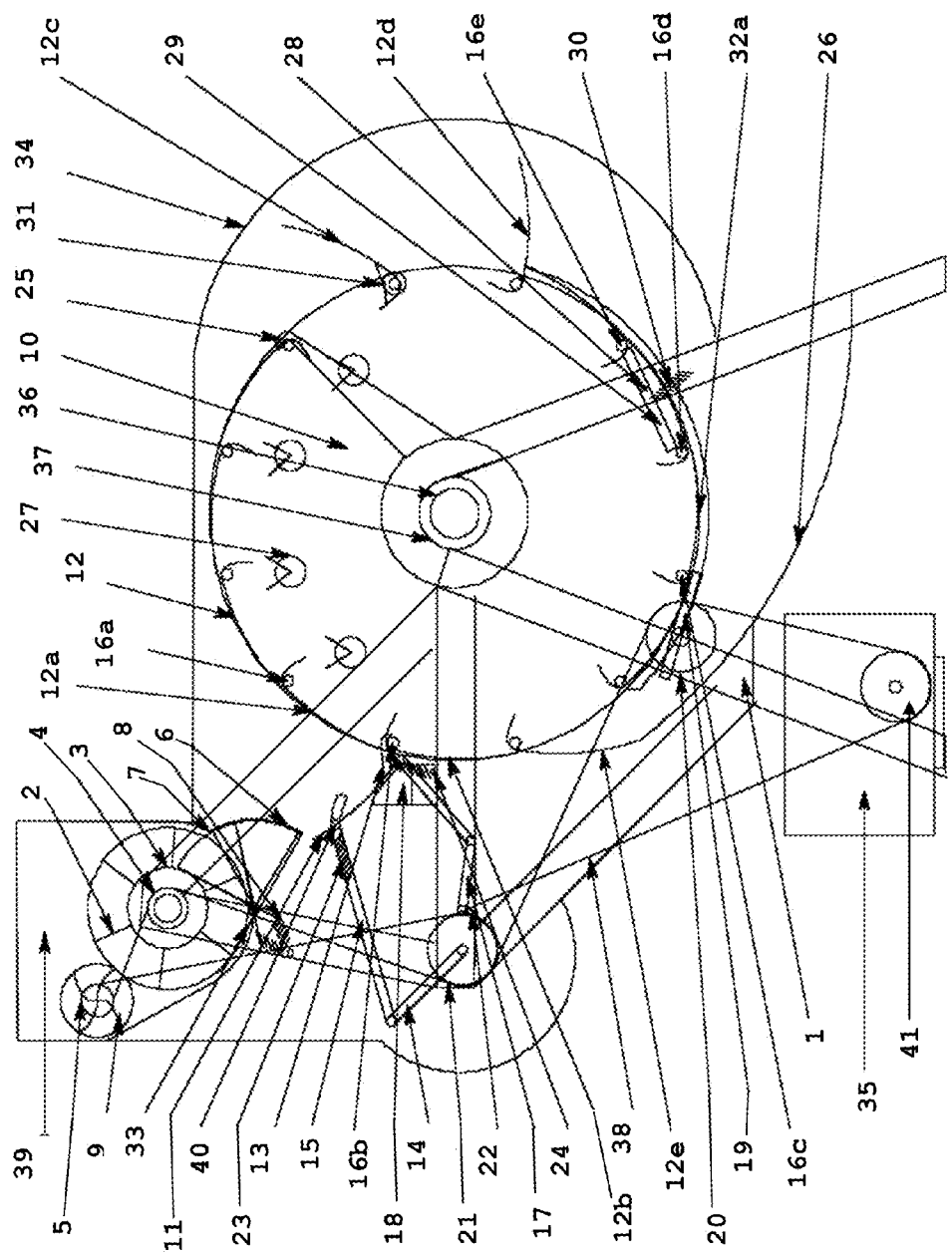
FIG. 1—General view of the oven where the innovative features of kneading and portion dispensing mechanism and moving press system are shown.

The invention comprises three devices that intervene in the preparation and supply of the dough, in the shaping and positioning of the raw dough discs, and as well as roasting and baking of the tortilla. To achieve this, a mechanism that supplies the portions of dough, a pressing system and a spinning broiling oven are needed.

The design is in regards to a cylindrical broiling oven with a horizontal axle made to cook food, which includes a mechanism made up of tabs and blades that mix, knead and supply the proper portions of dough as well as a press that places the flattened dough to be processed and transformed into a tortilla.

The outer surface of the oven is employed to broil one side of the product so as to keep its texture and moistness. The other side is subsequently broiled on the inner surface of the oven as it turns by means of a actuating arm which deploys sequentially each pivoting bolt along the edge of the circular covers of the oven as it will be explained later.

Inside the oven a system of gas burners or another source of heat supply may be found, to heat the surfaces and the volume of air found within. In order to achieve this, the inner surface of the oven is composed of metal tab plates called metal tabs, placed parallel one after the other which have one side edge bent in a straight angle towards the axle of the oven so that the product shall stay in its place during the cooking phase on the inner surface of the cylinder.

The metal tabs may turn partially either through gravity or by means of a pivoting spring on each side of the pivoting bolt that works as an axle, which are controlled by a guide that can be internal or external to the oven so that they may lay down a certain angle, unloading the product and allowing it to fall on the inverted face of the preceding metal tab, which had just transferred the product to the previous one before it, thereby finishing the cooking process on the inner side of the oven thereafter reaching the far end where the process started. At this time the metal tabs will lay up in the same way to release the finished product.

For descriptive purposes to the functioning process of the machine and unless otherwise specified, the folding over per gravity type metal tabs to the exiting part of the oven will be referred hereafter.

A mechanism of kneading positioning of the dough is also featured in order to place the batter in the oven. Said mechanism is comprised of radial blades joined at the core all of which we will now call the rotor. This rotor turns on its axle and at the same time works together with another axle that contains one or several helicoidally shaped blades placed along a turning roller. This serves the purpose of displacing and kneading the dough in such a way that the batter is contained between the blades of the rotor with enough consistent movement and pressure to unload the dough to become processed with a moving press which will now be described.

The moving press system is composed of a plate, called a flapper plate, hooked on to the pivoting bolt of the idle metal tabs that sequentially presses by means of a mechanism during the lap time of the broiling oven, against the outer surface of each metal tab. This action also places the now flattened dough on the metal tab, to be cooked and roasted at the same time during the process.

The machine may be enclosed with a thermal cover that will maintain optimal inner heat.

DETAILED DESCRIPTION OF THE INVENTION

The machine is composed of three systems (FIG. 1) mounted on a structure (1) that keeps it fixed to the ground while supporting stress and loads commonly experienced during the process. It is moved by a power source (35) through the transmitting gear or sprocket (41) and a system of gears or chain sprockets (4, 5, 20, and 21) and a drive chain (38) named power system for the processing of baked goods, which will mainly be tortillas, and will be called this way during the description of the invention.

Figure 2:
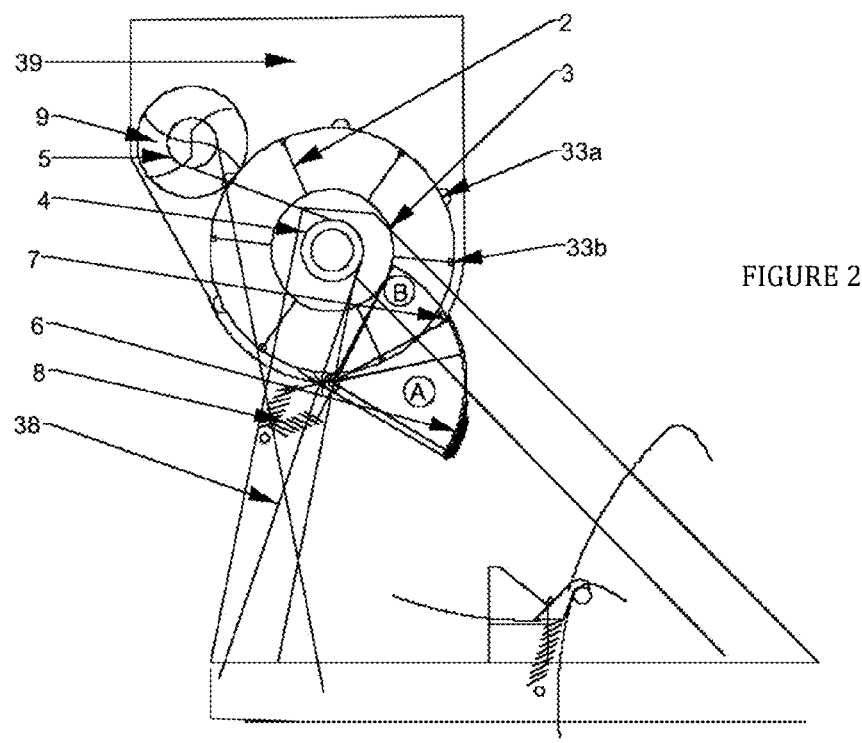
FIG. 2—Scheme of the kneading and portion dispensing mechanism.

The kneading and portion dispensing mechanism (FIG. 2), is composed of a series of blades (2), laid out radially and joined at the root to the core (3) called the rotor (2,3), whose axle is turned by a rotor gear or chain sprocket (4) coupled to the power source (35) through the drive chain (38) where said rotor is found inside a hopper (39) that has one or more discharge holes (6) for unloading the dough portions, which are closed by a pivoting hatch (7) synchronized with the rotor and moved with a hatch cam (33a) mounted on the rotor that allows the blade (2) to move while it passes during the dough discharge, and cut the portion of the dough in position A (FIG. 2), against the discharge holes (6); once the blade (2) has passed, said pivoting hatch (7) actuated upon in a similar way from the corresponding hatch cam (33b), and by means of a two position mechanism (8), is placed radially behind the blade that just passed through in position B (FIG. 2), to allow unloading of the dough through the discharge hole (6) intended for this purpose during the rotor movement, and blocking the return motion of the dough while the discharge holes are open. In this way the portion of the dough is formed and shaped to be cooked.

Once the dough has been released from the dispensing chamber between the blades, the empty space will be refilled in the next cycle, by the sheer weight of the processing dough and by a shaft that holds alongside its axle one or several blades positioned in a helicoidally fashion, called worm (9), which rotates counter wise to the direction of the rotor and is driven in the same way as the rotor by means of the worm gear or chain sprocket (5), this will force the dough into the chambers to be laid without voids, in between the section of the rotor blades.

The position and forming of the dough is done through a moving press in which the portions of dough are placed on the flapper plate (11) of the press (FIG. 3A), which is shifted sequentially over onto the metal tab (12), with the dough in between, that now is pressed and laid against the loading metal tab in turn (12a), usually at a position of 30° to 45° in reference to the horizontal line, on the outer face of broiling oven (10). The turning motion of the cylinder must be paused and synchronized with said pressing mechanism in order to load and press the dough portions, and is carried out in the following way:

As the broiling oven (10) is in the idle stage, the flapper plate (11) is in Position C (FIG. 3A) ready to receive the portions of dough, supported on the guide and positioning stop (18), and the pivoting hook (13) is moved to latch onto the pivoting bolt (16b) of the next metal tab that will receive the press called idle metal tab (12b) where this flapper plate will receive the portions of dough on its pressing surface.

At this time the final link (14) articulated to the pressing bar (15) is synchronized with the turning motion of the broiling oven (10) usually by means of a drive chain (38) that conveys the motion of the actuating arm drive sprocket (20) to the final link drive sprocket (21).

Then the flapper plate (11) pivots on the idle metal tab pivoting bolt (16b) to press the dough together with the loading metal tab (12a) to position D (FIG. 3B) in the following way:

Since the aforementioned position D of the flapper plate (11) (FIG. 3B) is found before the final travel range of the final link (14), the pressing bar (15) is extended overcoming the pre load force of an extension spring (23) that is compressed until full travel arch α is achieved, hence making contact with the loading metal tab pivoting bolt (16a) during extension and continues the pressing stage of the plate as it levers against the support fittings of the plate (40). The spring in addition to allowing the overpass of the mechanism also absorbs the compression mechanical loads on the joints.

Figure 3A:
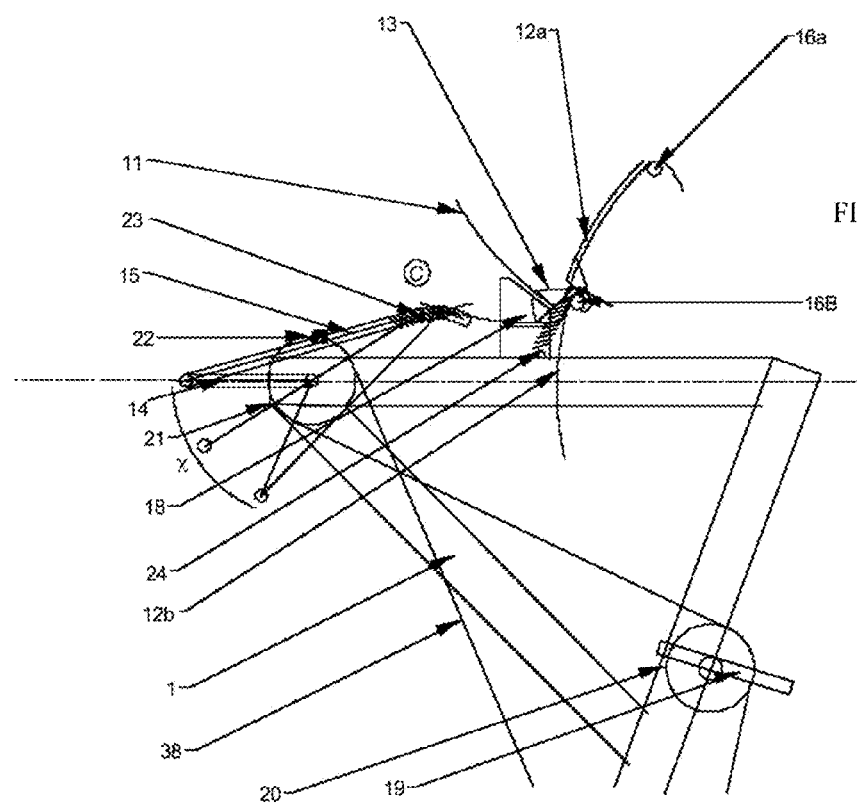
FIG. 3A—Scheme of the moving press system for dough flattening at the receiving stage the portions.
Figure 3B:
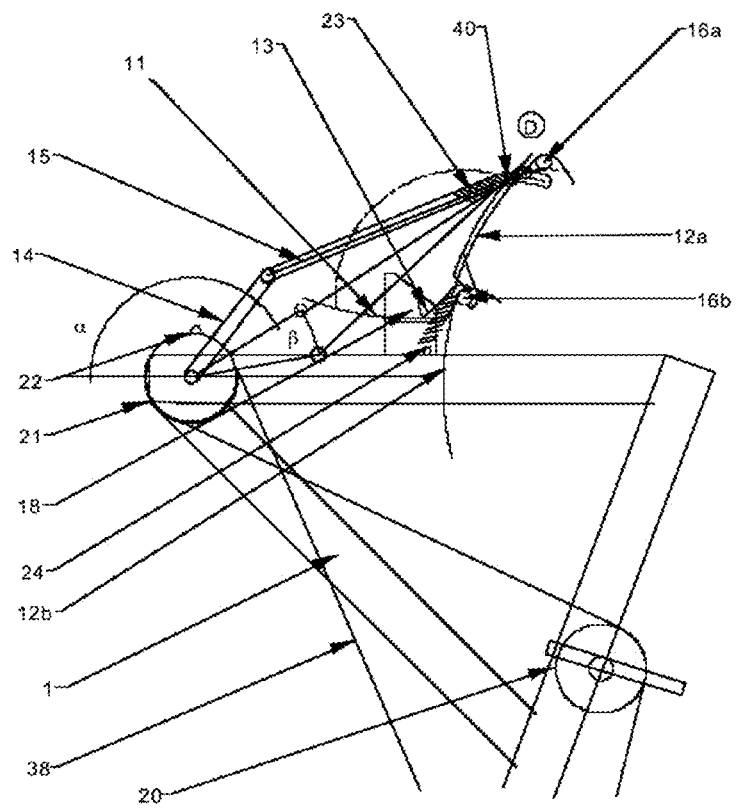
FIG. 3B—Scheme of the moving press system at the dough portions pressing stage.
Figure 3C:
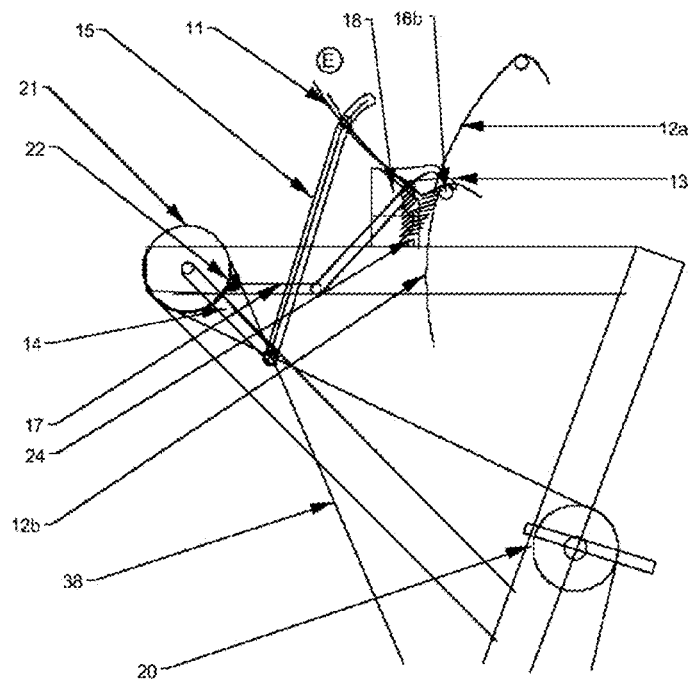
FIG. 3C—Scheme of the moving press system at the tab release stage.

As the final link (14) continues rotating, the pressing bar (15) moves up to angle β, and disengages from the loading metal tab pivoting bolt (16a) FIG. 3B, once the dough has been flattened the tension of said extension spring is released and the flapper plate (11) starts its regression turn by shifting in the opposite direction until position E (FIG. 3C) is reached, at this point the pivoting hook (13) is unhooked from the idle metal tab pivoting bolt (16b) through the plate change up lever (17) actuated by a cam (22) linked to the final link drive sprocket (21).

Then the motion of the broiling oven (10) is resumed simultaneously with the completion of the shift of the final link (14) until the idle metal tab (12b) will now become the loading metal tab (12a) and will mate with the flapper plate (11) aided by a positioning spring (24) that moves the flapper plate down, following the contour of the guide and positioning stop (18) serving as a hinge, in order to sequentially latch the pivoting bolt of the new idle metal tab (12b) hence starting the cycle all over again once the oven is paused and the moving press in a position to receive the next portion of dough.

The plate is held in the receiving position C (FIG. 3A) supported on one side on the guide and positioning stop (18), and during the stretching of the positioning spring (24) that holds it on the other side supported on the pivoting hook (13); since the stop position of the moving press plate is found before the maximum displacement of the final link (14), the pressing bar extends now pulling the extension spring (23) in a similar way as in the pressing process, permitting a lap to load the portions of dough, as the final link turns along the arch χ (FIG. 3A).

Figure 4A:
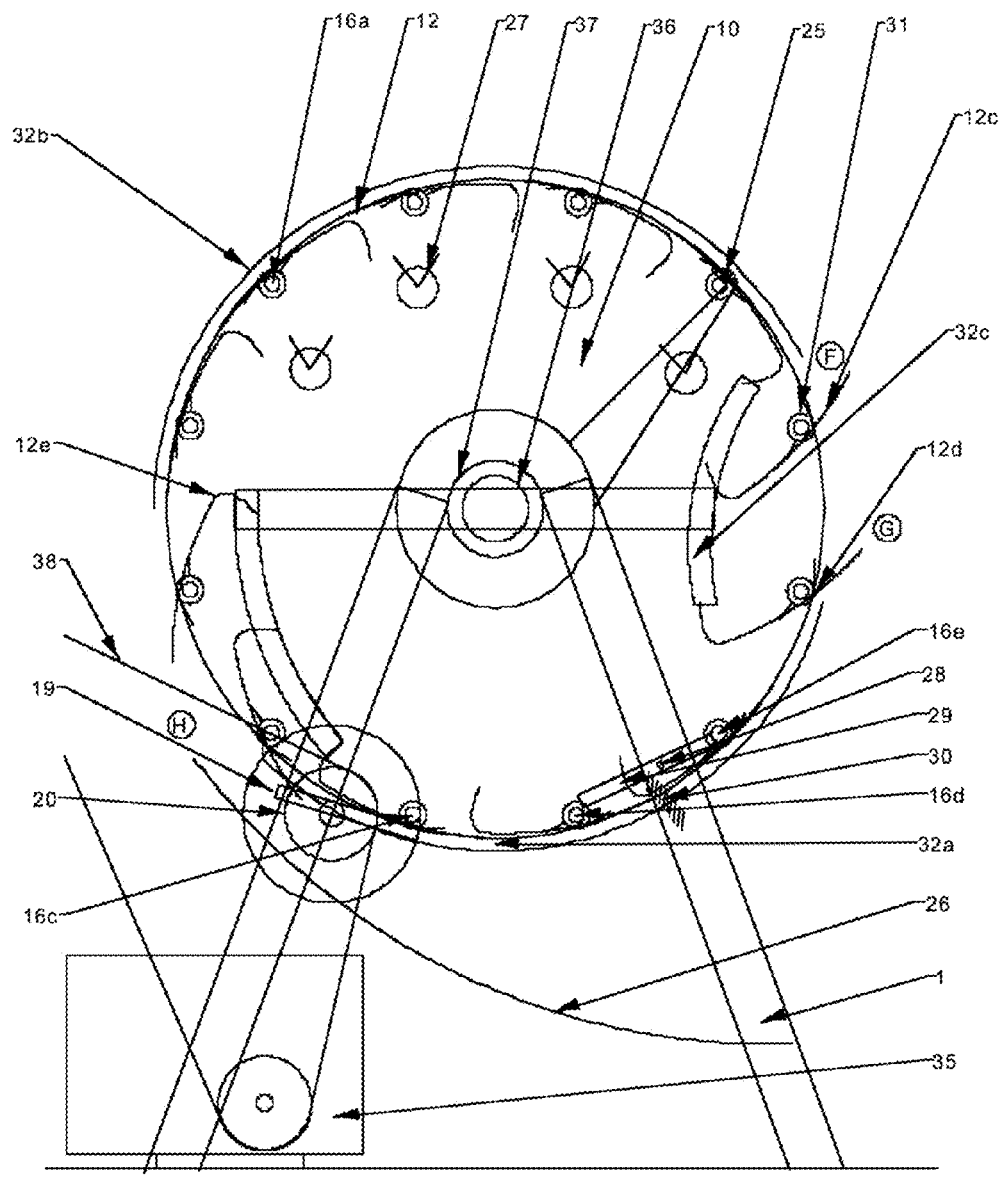
FIG. 4—View of the oven with metal tabs folding over the inner side.
FIG. 4B—View of the oven with metal tabs folding over towards the outer side.
Figure 4B:
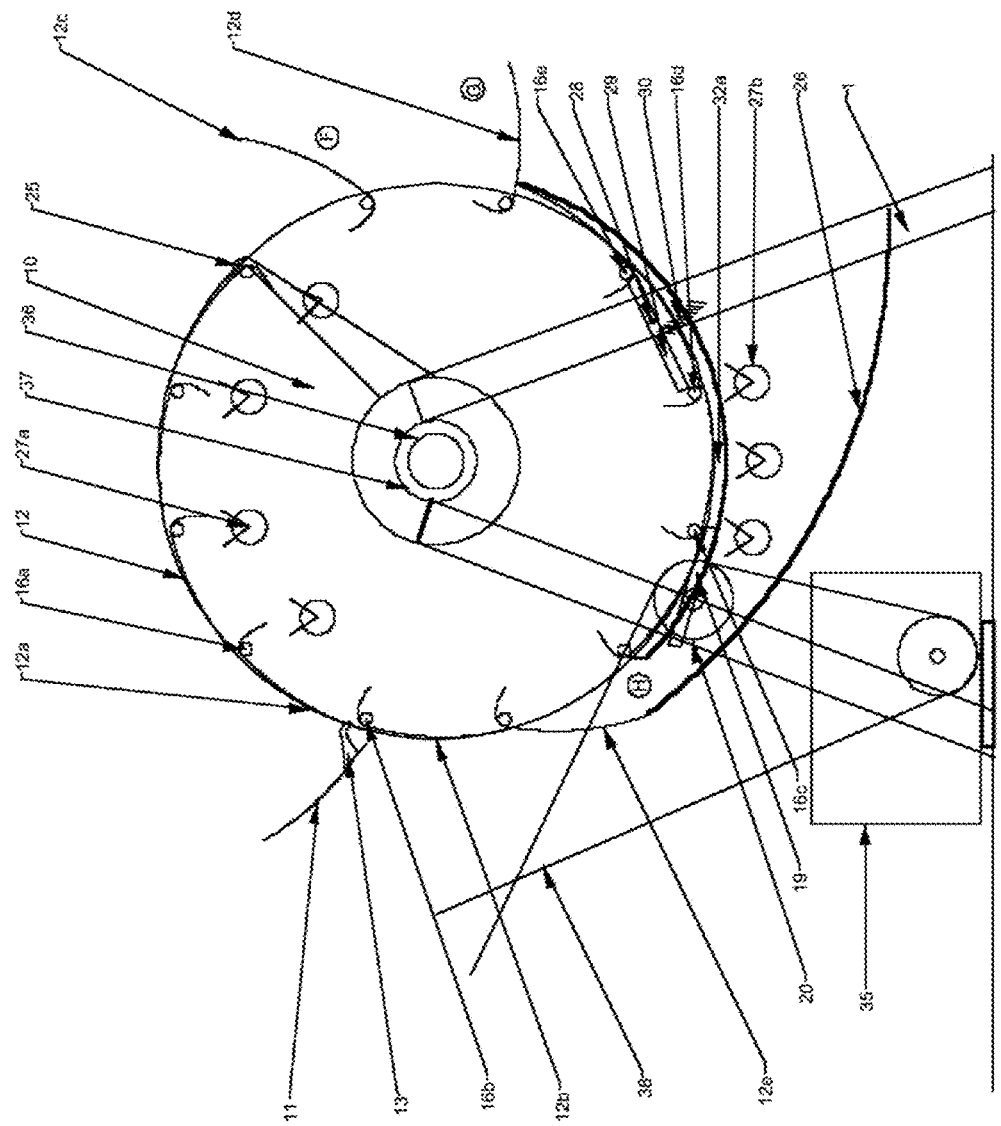

The cooking of the tortilla is performed by the horizontal axle cylindrical broiling oven that is composed by two circular covers (42) which are the lateral sides of the broiling oven (10), fixed together by a structure that holds them in a parallel fashion, the oven rotates on its axis in a sequentially paused process over two semi axes (36) coupled to two bushings or bearings (37) that will support the oven on the structure (1), to carry out a full turn with the time required to cook the product, usually driven by a power source (35) together with a geared speed decreasing box, and an arrangement of drive sprocket and chain (38); between the circular covers (42) are the metal tabs inserted by the pivoting pins to the holes or bushings (43) around the periphery which may fold over to the inner side of the oven (FIG. 4A) or in a similar fashion but outwardly (FIG. 4CB) in turn of their pivoting bolts (16) as it will be described:

Once the metal tabs (12) have been properly heated by means of one or several burners or a heating source placed in the inner upper side (27*a*) of the broiling oven (10) FIG. 4B or likewise in the lower outer side (27*b*), FIG. 4A or a combination of both inner and outer, the motion begins with the actuating arm (19) typically during the one third of a turn of the actuating arm drive sprocket (20) deploying the corresponding drive pivoting bolt (16*c*). During this lap the cylinder rotates until it is released from the contact point of said drive pivoting bolt.

During the advance, the forward part of the stopping cam (29), supported on an axle bolt of the cam (28), is raised by the pivoting bolt of the metal tab in turn (16*d*) which positions it to contact with the back part with the next bolt in turn (16*e*) in order to brake the inertia motion of the cylinder and stop it suddenly, once the forward cycle is complete. Then the stopping cam falls, either by the cam spring (30) or sheer gravity, to dislodge the cylinder allowing it to move as the next bolt in turn moves for the next cycle.

Consecutively, while the cylinder is idle, the raw dough discs are placed on each metal tab as the oven turns slowly it will move the range of half a turn approximately, where the metal tab (12*c*) will deploy at certain angle, in order to transfer the tortilla that has been now cooked on one side.

In the F position (FIG. 4A or B), the tortilla shall be transferred with the opposite side now face down to the previously deployed metal tab (12*d*), position G (FIG. 4A or B), thereafter the metal tab will be repositioned to close the gap through the guide (32*a*) that runs along the lower arch of the cylinder during the turning of a half turn approximately, where the cooking phase shall be completed on the inner surface of the oven until reaching position H where the metal tab is partially deployed (12*e*) at the end of the guide (32*a*) to be repositioned through gravity once it reaches the position of the upper arch of the oven.

The aforementioned metal tabs movement may be reinforced with the use of a pivoting spring (31) on each pivoting bolt (16) of the metal tab, where these springs will be force opened in which case the guide will also be found on the uppermost part of the oven (32*b*), leaving all outer boundaries with a guide, with the exception of the opening points labeled F, G and H or mainly on the option when metal tabs will be inwards folding over type, the metal tabs may be force closed on the transfer positions mentioned in F and G as well as in the tortilla release position H, by means of a guide (32*c*) that is found on the inner side of the oven, supported by the structure (1) passing through the semi axes (36) drill.

Afterward once the oven has completed the other half turn, in position H, the tortilla falls sliding along an inclined plate (26) to be positioned with the rest of the finished product.

The metal tabs maybe enclosed with a non-stick covering or likewise a device that will separate the product from the metal tab such as a blade or a stretched tight wire (25) that will skim the surface of the metal tabs, may be required.

Figure 5:
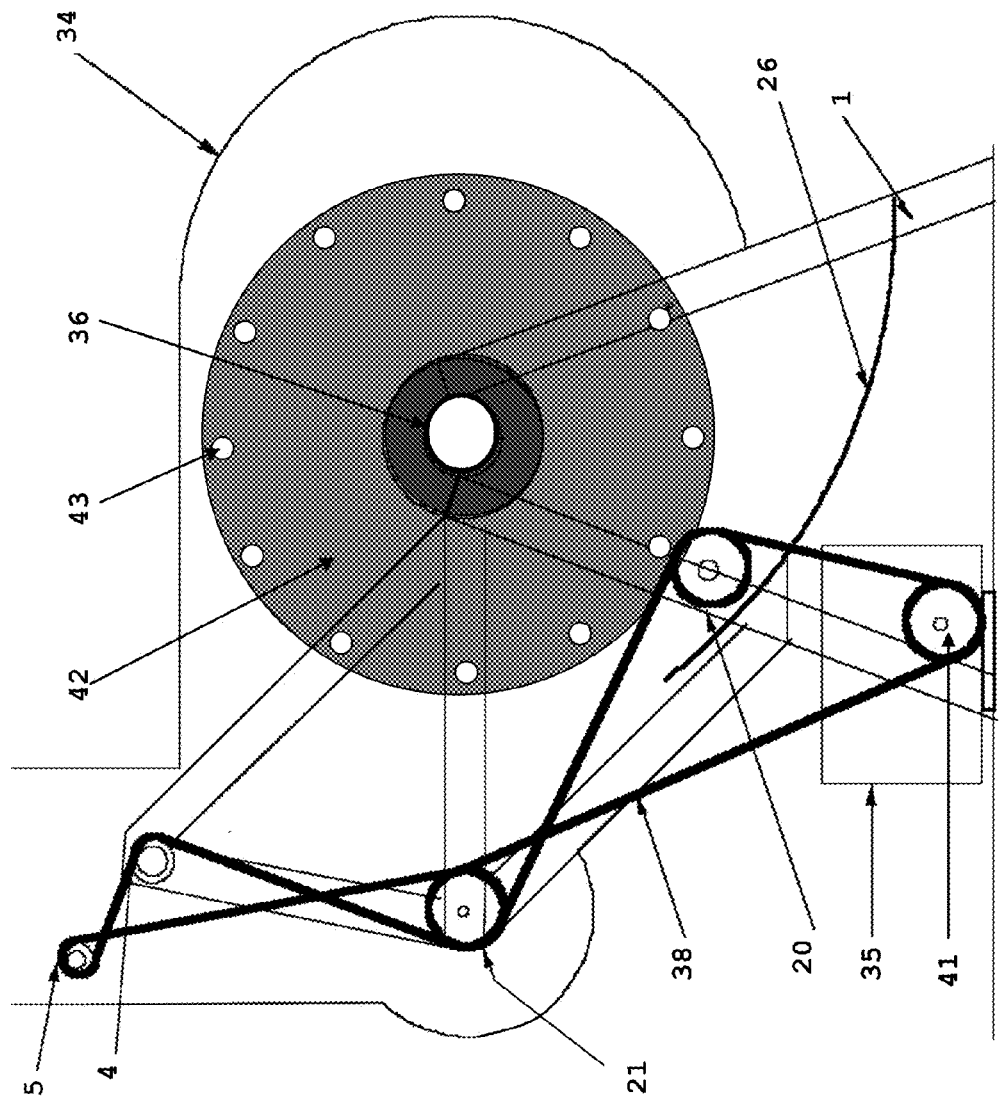
FIG. 5—View of the driving system, structure and typical cover used by the oven during its operation.

The machine may be enclosed in a thermal cover (34) (FIG. 5) that may have vents and windows so as to keep inner heat and avoid contamination due to external environmental sources.

What is claimed is:

1. A horizontal axle cylindrical tortilla maker, comprising:
   a broiling oven for cooking a raw dough disc into a tortilla, comprising:
      two circular covers forming lateral sides of the broiling oven, each cover having a central hole and a plurality of holes proximate a periphery,
      a plurality of metal tabs disposed between the two circular covers, and a plurality of pivoting bolts inserted through the holes of each circular cover for supporting the plurality of metal tabs, the two circular covers and the plurality of metal tabs form a cylindrical shape of the broiling oven,
      a pivoting spring located about each pivoting bolt to effect movement of a respective metal tab,
      two tubular semi axes disposed within the central hole of the two circular covers for supporting the broiling oven on a structure,
      a stopping cam having one end capable of being lifted by a first pivoting bolt in such a way that an opposite end of the stopping cam makes contact with a second, adjacent pivoting bolt to pause rotation of the broiling oven for a predetermined period of time,
      an actuating arm driven in a circular manner for displacing the pivoting bolt of each metal tab of the broiling oven,
      at least one guide mounted on the structure for controlling movement of the plurality of metal tabs,
      at least one gas burner or heat source for increasing a temperature of the plurality of metal tabs, and
      an inclined plate that receives the tortilla;
   a kneading and portion dispensing mechanism, comprising:
      a hopper for receiving raw dough, the hopper including one or more discharge holes for dispensing portions of raw dough through a pivoting hatch,
      a rotor disposed within the hopper, the rotor having a plurality of blades extending radially outward from the rotor, and
      a two position mechanism for opening and closing the pivoting hatch of the hopper to allow a predetermined amount of the raw dough through the one or more discharge holes; and
   a moving press, comprising:
      a flapper plate for receiving the predetermined amount of raw dough from the kneading and dispensing mechanism, the flapper plate pivotable at one end about a first pivoting bolt of the plurality of pivoting bolts and having a pivoting hook at an opposite end for hooking onto one of the plurality of pivoting bolts of the broiling oven,
      a pressing bar engaging a second pivoting bolt when the predetermined amount of raw dough is located between the flapper plate and a loading metal tab of the plurality of metal tabs to flatten the predetermined amount of raw dough into the raw dough disc,
      a guide and positioning stop for supporting the flapper plate when the flapper plate receives the predetermined amount of raw dough from the kneading and portion dispensing mechanism, and wherein, as the pressing bar continues to rotate, the flapper plate returns to a position so as to be supported on the guide and positioning stop, and wherein the pivoting hook engages the another one of the plurality of pivoting bolts of the broiling oven to prevent the flapper plate from moving for the predetermined period of time needed to receive the predetermined amount of raw dough;

a final link articulated to the pressing bar, the final link disengaging the pivoting hook of the flapper plate from the second pivoting bolt of the plurality of pivoting bolts once the predetermined amount of raw dough is flattened into the raw dough disc.

2. The horizontal axle cylindrical tortilla maker according to claim 1, further comprising a power system including a power source, a plurality of gears or chain sprockets, and a drive chain driven by the power source for rotating the broiling oven, the rotor, and the final link.

3. The horizontal axle tortilla maker according to claim 2, wherein the power system synchronizes a rotation of the rotor of the kneading and dispensing mechanism with the rotation of the broiling oven and a supply of raw dough discs to the broiling oven by the moving press.

4. The horizontal axle tortilla maker according to claim 1, wherein the stopping cam stops the rotation of the broiling oven to allow enough time for the predetermined amount of raw dough from the kneading and dispensing mechanism to be placed on the loading metal tab of the plurality of metal tabs.

5. The horizontal axle tortilla maker according to claim 1, wherein the rotor of the kneading and dispensing mechanism is synchronized with an actuating arm of the broiling oven and with the pivoting hatch of the hopper such that the plurality of blades of the rotor rotate while the pivoting hatch is pivoted to an outer side of the hopper by the two position mechanism, and is pivoted to an inner side of the hopper by the two position mechanism once the plurality of blades of the rotor have forced the predetermined amount of the raw dough through the one or more discharge holes and onto the flapper plate.

6. The horizontal axle tortilla maker according to claim 1, further comprising a worm located near the rotor that is rotated in a different direction with respect to the rotor to force the raw dough between the plurality of blades of the rotor.

7. The horizontal axle tortilla maker according the claim 1, wherein the final link of the moving press is synchronized with an actuating arm of the broiling oven in order to make a complete rotation during the pause of the rotation of the broiling oven, and wherein the flapper plate moves half a cycle in both directions during the complete rotation of the final link in order to flatten the predetermined amount of raw dough against the loading metal tab of the plurality of metal tabs.

8. The horizontal axle tortilla maker according to claim 1, wherein a range of travel of the flapper plate is less than a range of travel of the final link such that an extension spring is compressed from a natural position so as to extend the pressing bar outwards with respect to the flapper plate, thereby leaving the predetermined amount of raw dough that has been flatten on the loading metal tab of the plurality of metal tabs.

9. The horizontal axle tortilla maker according to claim 8, wherein, once the predetermined amount of raw dough has been flattened, a plate change up lever is moved by a cam of the final link in order to release the pivoting hook from the second pivoting bolt of the plurality of pivoting bolts and allowing rotation of the broiling oven.

10. The horizontal axle tortilla maker according to claim 9, wherein the pivoting hook of the flapper plate is moved downward by the positioning spring and the guide and positioning stop, and placed in a ready position to hook onto another one of the plurality of pivoting bolts of the broiling oven.

11. The horizontal axle cylindrical tortilla maker according to claim 1, wherein the broiling oven cooks one side of the raw dough disc on one of the plurality of metal tabs until approximately one-half rotation of the broiling oven is completed, and wherein the broiling oven cooks an opposite side of the raw dough disc on a different one of the plurality of metal tabs until another one-half rotation of the broiling oven.

12. The horizontal axle cylindrical tortilla maker according to claim 11, wherein, once a complete rotation of the broiling oven has taken place, the tortilla falls by gravity trough a gap located at an unloading point of the broiling oven and onto the inclined plate.

13. The horizontal axle cylindrical tortilla maker according to claim 1, further comprising a thermal cover for minimizing heat loss from the broiling oven and preventing contaminants from entering the tortilla maker.

* * * * *